(12) United States Patent
Venkatesan et al.

(10) Patent No.: US 9,996,156 B2
(45) Date of Patent: Jun. 12, 2018

(54) FEEDBACK REDUCTION FOR A USER INPUT ELEMENT ASSOCIATED WITH A HAPTIC OUTPUT DEVICE

(71) Applicant: Immersion Corporation, San Jose, CA (US)

(72) Inventors: Srivatsav Venkatesan, Sunnyvale, CA (US); Kaniyalal Shah, Fremont, CA (US); Douglas George Billington, Campbell, CA (US); Stephen Rank, San Jose, CA (US); Daniel Parker, San Jose, CA (US); Aaron Kapelus, Jamaica Plain, MA (US)

(73) Assignee: IMMERSION CORPORATION, San Jose, CA (US)

(*) Notice: Subject to any disclaimer, the term of this patent is extended or adjusted under 35 U.S.C. 154(b) by 128 days.

(21) Appl. No.: 14/979,338

(22) Filed: Dec. 22, 2015

(65) Prior Publication Data
US 2016/0195930 A1     Jul. 7, 2016

Related U.S. Application Data

(60) Provisional application No. 62/096,251, filed on Dec. 23, 2014.

(51) Int. Cl.
*G06F 3/01*     (2006.01)
*A63F 13/285*   (2014.01)
*A63F 13/23*    (2014.01)

(52) U.S. Cl.
CPC .............. *G06F 3/016* (2013.01); *A63F 13/23* (2014.09); *A63F 13/285* (2014.09)

(58) Field of Classification Search
None
See application file for complete search history.

(56) References Cited

U.S. PATENT DOCUMENTS

| | | | |
|---|---|---|---|
| 6,020,876 A  * | 2/2000 | Rosenberg | G06F 3/011 345/157 |
| 2005/0009606 A1 | 1/2005 | Murzanski et al. | |
| 2005/0052415 A1 | 3/2005 | Braun et al. | |
| 2006/0142657 A1 | 6/2006 | Quaid et al. | |
| 2014/0218317 A1 | 5/2014 | Aberg et al. | |
| 2014/0300454 A1 | 10/2014 | Lacroix et al. | |

FOREIGN PATENT DOCUMENTS

| | | |
|---|---|---|
| WO | 9952614 A1 | 10/1999 |
| WO | 2014132104 A1 | 9/2014 |

* cited by examiner

*Primary Examiner* — Christopher Kohlman
(74) *Attorney, Agent, or Firm* — Miles & Stockbridge P.C.

(57) ABSTRACT

The embodiments are directed toward techniques for isolating a user input signal at a haptic output device. A signal originating from a user input element associated with the haptic output device is received. The received signal is separated into a first component including the user input signal, and a second component including a haptic feedback signal. While the first component is processed, the second component can be discarded or otherwise ignored.

24 Claims, 9 Drawing Sheets

300

400

800

FEEDBACK REDUCTION FOR A USER INPUT ELEMENT ASSOCIATED WITH A HAPTIC OUTPUT DEVICE

PRIORITY APPLICATION

This application claims the benefits of U.S. Provisional Patent Application No. 62/096,251, filed on Dec. 23, 2014, which is incorporated herein by reference in its entirety.

FIELD OF INVENTION

The embodiments are generally directed to electronic devices, and more particularly, to electronic devices that produce haptic effects.

BACKGROUND

Video games and video game systems have become extremely popular. Video game devices or controllers typically use visual and auditory cues to provide feedback to a user. In some interface devices, kinesthetic feedback (e.g., active and resistive force feedback) and/or tactile feedback (e.g., vibration, texture, temperature variation, and the like) may be provided to the user. In general, such feedback is collectively known as "haptic feedback" or "haptic effects." Haptic feedback provides cues that enhance and simplify a user's interaction with a video game controller, or other electronic device. For example, haptic effects may provide cues to users of video game controllers or other electronic devices to alert the user to specific events, or provide realistic feedback to create greater sensory immersion within a simulated or virtual environment.

Other devices in which a user interacts with a user input element to cause an action also may benefit from haptic feedback or haptic effects. For example, such devices may include medical devices, automotive controls, remote controls, and other similar devices.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example embodiment, functionality for isolating a user input signal at a haptic output device is provided. A signal originating from a user input element associated with the haptic output device is received. The received signal is separated into a first component including a user input signal, and a second component including a haptic feedback signal. While the first component is processed, the second component can be discarded or otherwise ignore, if desired.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Example embodiments are directed toward techniques for isolating a user input signal at a haptic output device. A signal originating from a user input element associated with the haptic output device includes the user input signal. In some instances, the haptic output device generates an unintended feedback signal which may interfere with the user input signal. For example, torque generated by the haptic output device (e.g., a trigger actuator) may cause such feedback signals. In order to avoid interference, the received signal is separated into a first component including the user input signal, and a second component including the haptic feedback signal. For example, the first and second components may be separated using a filter, such as a low pass, high pass, or band filter. While the first component having the user input signal may be executed by a host device, the second component can be discarded or otherwise ignored.

To reduce the likelihood of the unintended feedback signals, the duration of the haptic effect should be less than its rendering rate. For example, if a gaming weapon has a rendering rate of 100 ms, its haptic effect should be rendered no more than once per 100 ms. Even after factoring for the rendering rate, the unintended feedback signals may still cause significant interference. For example, torque generated by the haptic output device can be amplified several times (e.g., nine times) through a gearbox mechanism coupled to a shaft. Here, the shaft may experience a large torque in response to a relatively small movement of the haptic output device. As the haptic output device's potentiometer may be directly coupled to the shaft, it generates a potential difference corresponding to the amplified torque. For example, a 2V feedback signal may be produced by the haptic output device in response to high frequency haptic effects (e.g., machine gun effect generated by a maximum push-pull effect). Although high frequency effects are used as an example, the embodiments of the invention may be applied to a variety of haptic effects and applications (e.g., racing games, sports games, etc.).

In the various embodiments, a variety of user interfaces and methods for using a device are described. In some embodiments, the device is a portable electronic device (e.g., a game controller, console, mobile phone, smartphone, tablet, etc.). It should be understood, however, that the user interfaces and associated methods may be applied to numerous other devices, such as personal computers, medical devices, laptops, and the like that may include one or more other physical user-interface devices, such as a keyboard, mouse, trackball and the like.

Figure 1:
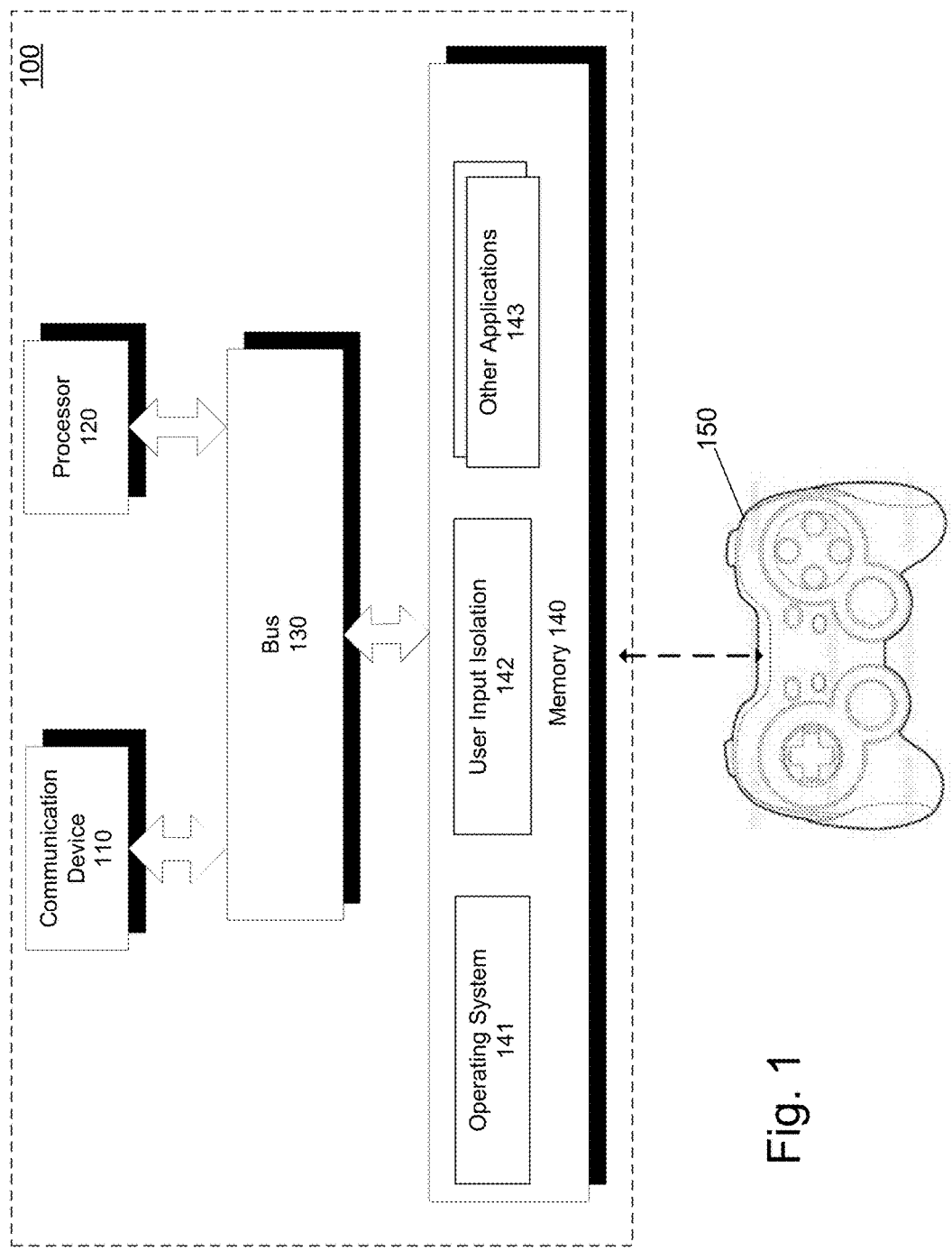
FIG. 1 illustrates a block diagram of a system according to an example embodiment of the present invention.

FIG. 1 illustrates a block diagram of a system 100 according to an example embodiment of the present invention.

System 100 may include a communication device 110 configured to transmit and/or receive data from remote sources. Communication device 110 may enable connectivity between a processor 120 and other devices by encoding data to be sent from processor 120 to another device over a network (not shown) and decoding data received from another system over the network for processor 120.

For example, communication device 110 may include a network interface card that is configured to provide wireless network communications. A variety of wireless communication techniques may be used including infrared, radio, Bluetooth, Wi-Fi, and/or cellular communications. Alternatively, communication device 110 may be configured to provide wired network connection(s), such as an Ethernet connection.

Processor 120 may comprise one or more general or specific purpose processors to perform computation and control functions of system 100. Processor 120 may include a single integrated circuit, such as a microprocessor, or may include multiple integrated circuit devices and/or circuit boards working in cooperation to accomplish the functions of processor 120. In addition, processor 120 may execute computer programs, such as an operating system 141, a user input isolation module 142, and other applications 143, stored within memory 140.

System 100 may include memory 140 for storing information and instructions for execution by processor 120. Memory 140 may contain various components for retrieving, presenting, modifying, and storing data. For example, memory 140 may store software modules that provide functionality when executed by processor 120. The modules may include operating system 141 that provides operating system functionality for system 100. The modules may further include user input isolation module 142 that is configured to isolate the user input signals originating from the user input elements of controller 150. For example, user input isolation module 142 may be configured to filter feedback signals generated by the haptic output devices associated with the user input elements of controller 150. By filtering the feedback signals, system 100 is able to execute the user input signals without interference from the feedback signals. System 100 also may include one or more additional application modules 143 that include additional functionality, such as peripheral firmware configured to provide control functionality for a peripheral device, such as controller 150 (e.g., a gamepad, wearable device, etc.).

Non-transitory memory 140 may include a variety of computer-readable media that may be accessed by processor 120. In the various embodiments, memory 140 may include volatile and nonvolatile media, removable and non-removable media. For example, memory 140 may include any combination of random access memory ("RAM"), dynamic RAM ("DRAM"), static RAM ("SRAM"), read only memory ("ROM"), flash memory, cache memory, and/or any other type of non-transitory computer-readable media. Alternatively, or additionally, memory 140 may include one or more network or cloud accessible storage media.

Although shown as a single system, the functionality of system 100 may be implemented as a distributed system. For example, memory 140 and processor 120 may be distributed across multiple different computers that collectively comprise system 100. In one embodiment, system 100 may be part of a device (e.g., personal computer, console, video game console, etc.), and system 100 provides haptic effect functionality for the device. In another embodiment, system 100 may be separate from the device, and may remotely provide the aforementioned functionality for the device.

System 100 may be operably connected to controller 150. Controller 150 may be a peripheral device configured to provide input to the system 100. Controller 150 may be operably connected to system 100 using either a wireless connection or a wired connection. Controller 150 also may include a local processor configured to communicate with system 100 using either a wireless connection or a wired connection. Alternatively, controller 150 may be configured to not include a local processor, and all input signals and/or output signals associated with controller 150 may be processed by the components of system 100. In embodiments in which controller 150 has a local processor, additional functionality, such as user input isolation modules and peripheral firmware configured to provide control functionality may reside within controller 150.

Controller 150 may further include one or more digital buttons, one or more analog buttons, one or more bumpers, one or more directional pads, one or more analog or digital sticks, one or more driving wheels, and/or one or more user input elements that can be interacted with by a user, and that can provide input to system 100. Controller 150 may also include one or more analog or digital trigger buttons (or "triggers") that can further be interacted with by the user, and that can further provide input to system 100. As is described below in greater detail, controller 150 can further include a motor, or another type of actuator or haptic output device, configured to exert a bi-directional push/pull force on at least one trigger of controller 150.

Controller 150 can also include one or more actuators, or other types of haptic output devices. The local processor of controller 150, or processor 120 in embodiments where controller 150 does not include a local processor, may transmit a haptic signal associated with a haptic effect to at least one actuator of controller 150. The actuator, in turn, outputs haptic effects such as vibrotactile haptic effects, kinesthetic haptic effects, or deformation haptic effects, in response to the haptic signal. The haptic effects can be experienced at a user input element (e.g., a digital button, analog button, bumper, directional pad, analog or digital stick, driving wheel, or trigger) of controller 150. Alternatively, the haptic effects can be experienced at an outer surface of controller 150.

An actuator is an example of a haptic output device, where a haptic output device is a device configured to output haptic effects, such as vibrotactile haptic effects, electrostatic friction haptic effects, temperature variation, and/or deformation haptic effects, in response to a drive signal. In alternate embodiments, the one or more actuators within controller 150 can be replaced by some other type of haptic output device. The haptic output device may be, for example, an electric motor, an electro-magnetic actuator, a voice coil, a shape memory alloy, an electro-active polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, or an ultrasonic vibration generator. In some instances, the haptic output device may include haptic output drive circuit. In some embodiments, the haptic output device may be unidirectional or bidirectional.

Controller 150 may further include one or more speakers. The local processor of controller 150, or processor 120 in embodiments where controller 150 does not include a local processor, may transmit an audio signal to at least one speaker of controller 150, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 150 can further include one or more sensors. A sensor may be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor may further be configured to convert the detected energy, or other physical property, into an electrical signal, or any signal that represents virtual sensor information, and controller 150 can send the converted signal to the local processor of controller 150, or processor 120 in embodiments where controller 150 does not include a local processor.

Figure 2:
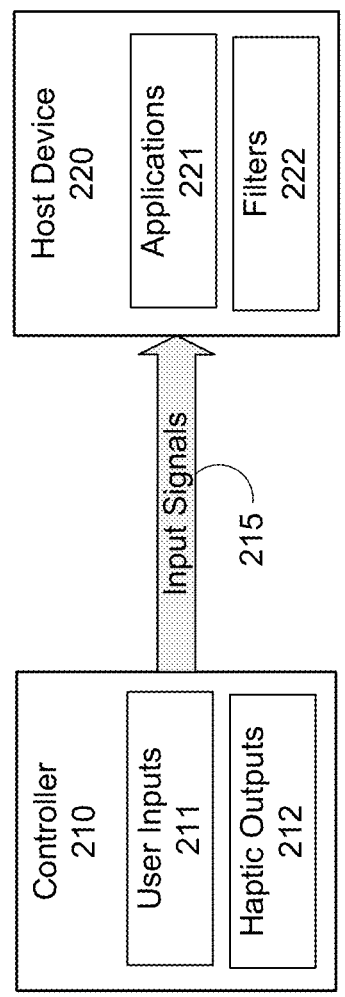
FIG. 2 is a simplified block diagram illustrating a system for isolating a user input signal according to an example embodiment of the present invention.

FIG. 2 is a simplified block diagram illustrating a system 200 for isolating a user input signal according to an example embodiment of the present invention.

As shown in FIG. 2, a controller 210 includes one or more user input elements 211 and one or more corresponding haptic output devices 212. Although controller 210 is configured to send user input signals 215 to a host device 220, haptic output devices 212 also may generate feedback signals. In some instances, the feedback signals interfere with user input signals 215. For example, torque generated by haptic output devices 212 (e.g., a trigger actuator) may cause the feedback signals.

Host device 220 may execute various programs, such as applications 221, which are configured to receive the user input signals. At host device 220, one or more filters 222 may separate the user input signals generated by user input elements 211 from the feedback signals generated by haptic output devices 212. In some embodiments, the user input signals and the feedback signals may be separated using filters 222, such as a low pass, high pass, or band filter. As each of the user input signals and the feedback signals are typically generated at different frequencies, filters 222 are configured to separate the two signal types. Thus, by implementing the embodiments of the present invention, applications 221 may be supplied with only the user input signals, and the feedback signals may be discarded or otherwise ignored.

Figure 3:
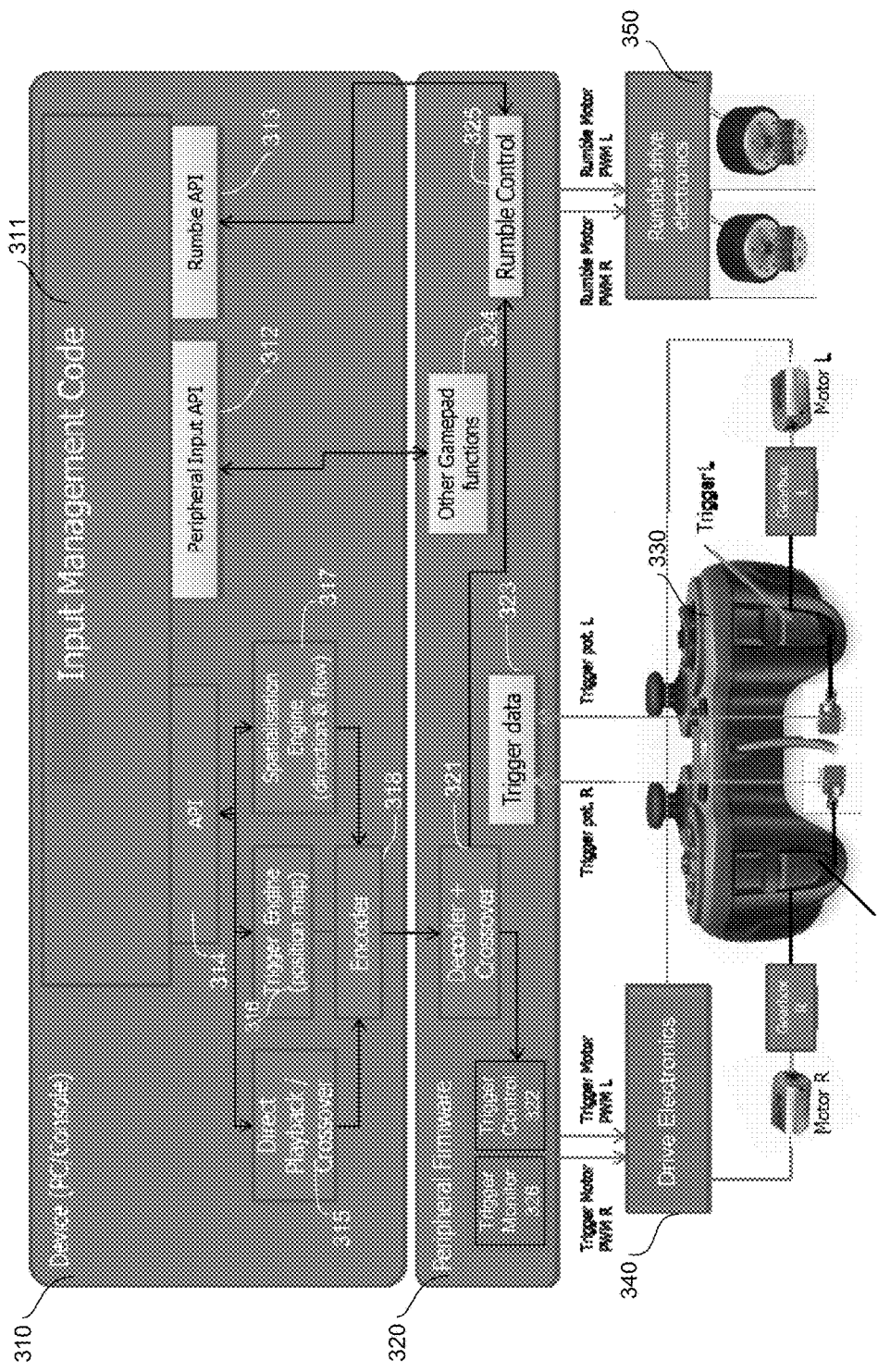
FIG. 3 illustrates a block diagram of a haptic effect software stack according to an example embodiment of the present invention.

FIG. 3 illustrates a block diagram of a haptic effect software stack 300 according to an example embodiment of the present invention. As shown in FIG. 3, software stack 300 includes device modules 310, peripheral firmware modules 320, controller modules 330, drive modules 340, and rumble drive modules 350. Haptic effect software stack 300 is implemented on a system, such as system 100 of FIG. 1.

Device modules 310 may include a variety of modules such as input management code 311, peripheral input application programming interface ("API") 312, rumble API 313, haptic effect API 314, direct playback/crossover 315, trigger engine 316, spatialization engine 317, and encoder 318.

Input management code 311 may include a set of computer-readable instructions that manage input provided by controller 330 in the context of a game application, or other type of application, executed within a device.

Peripheral input API 312 may include a set of computer-readable functions or routines that enable game input management code 311 to interact with peripheral firmware 320 in order to receive and manage input provided by controller 330.

Rumble API 313 may include a set of computer-readable functions or routines that enable input management code 311 to interact with peripheral firmware 320 in order to transmit rumble instructions to one or more rumble motors or rumble actuators of controller 330 (e.g., rumble motors L and R of FIG. 3). In addition, a rumble instruction may cause a rumble motor or rumble actuator of controller 330 to produce a general or rumble haptic effect.

Haptic effect API 314 (identified in FIG. 3 as "API") may include a set of computer-readable functions or routines that are accessible to input management code 311, and that enable input management code 311 to interact with peripheral firmware 320 in order to transmit haptic instructions to controller 330. In addition, a haptic instruction may cause one or more targeted motors or targeted actuators of controller 330 to produce a haptic effect at one or more user input elements of controller 330.

Haptic effect API 314 also may store one or more haptic effect definitions. A haptic effect definition is a data structure that includes haptic data, such as a haptic signal, that is pre-defined and that can be stored within a storage, such as a haptic file or haptic stream, and that can be sent to one or more rumble motors, rumble actuators, targeted motors, or targeted actuators, to produce a haptic effect at a component, or user input element, of controller 330. The haptic data can include one or more attributes of the corresponding haptic effect, where the attributes can be stored as parameters. Example parameters of a haptic effect definition may include an amplitude parameter, a frequency parameter, a waveform parameter, an envelope parameter, a magnitude (or strength) parameter, and a duration parameter.

Haptic effect API 314 may enable game input management code 311 to interact with direct playback/crossover 315, trigger engine 316, and spatialization engine 317, and may further manage direct playback/crossover 315, trigger engine 316, and spatialization engine 317 according to requests invoked by game input management code 311. Further, haptic effect API 314 may store data used for communication with peripheral firmware 320, and used for generation of one or more haptic effects.

Direct playback/crossover 315 may receive haptic data as input, produce haptic data as output, and transmit haptic data to one or more targeted motors, or targeted actuators, of controller 330 (e.g., motors L and R of FIG. 3). In some embodiments, direct playback/crossover 315 may output the input haptic data directly, without modifying a format of the input haptic data. This results in an "as-is" playback of the input haptic data. In other embodiments, direct playback/crossover 315 may convert the haptic data that is input from a first format to a second format, and can further output the converted haptic data. Depending on the type of playback, direct playback/crossover 315 may optionally use a programmable crossover to convert the haptic data. By converting the haptic data, device modules may deconstruct the haptic effect and playback the haptic effect at multiple actuators.

The format of the haptic data may be a haptic elementary stream ("HES") format. A HES format is a file or data format for representing haptic data that may be streamed to a device. The haptic data can be represented in a manner that is identical or similar to how uncompressed sound is represented, although the haptic data can be encrypted within the HES format.

Trigger engine 316 may receive haptic data, such as a haptic effect definition, and may modify the haptic data based on user input data, such as trigger data 323. Trigger data is data that includes one or more parameters that indicate a position and/or range of one or more triggers of controller 330 (e.g., triggers L and R of FIG. 3). Trigger engine 316 may further transmit haptic instructions to controller 330. For example, trigger engine 316 may transmit haptic instructions to a variety of user-input elements of controller 330. As previously described, a haptic instruction may cause one or more targeted motors or targeted actuators of controller 330 to produce a haptic effect at one or more user-input elements of controller 330.

Spatialization engine 317 may receive haptic data and may modify the haptic data based on spatialization data. Spatialization data may include data that indicates a desired direction and/or flow of a haptic effect, such as an ordering of haptic effects on respective user input elements. In certain embodiments, spatialization engine 317 may receive spatialization data that includes a direction and/or flow from input management code 311.

Spatialization engine 317 may modify the haptic data so that a haptic effect, such as a trigger haptic effect, is scaled for one or more rumble motors, or rumble actuators, of controller 330 (e.g., rumble motors L and R of FIG. 3), and that the haptic effect is also scaled for one or more targeted motors, or targeted actuators, of controller 330 (e.g., motors L and R, as illustrated in FIG. 3). In other words, spatialization engine 317 may modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 317 may scale one or more portions of the haptic effect. For example, spatialization engine 317 may scale haptic data that is sent to the motor or actuator that causes the haptic effect to be experienced, causing the haptic effect to be more pronounced (e.g., increased magnitude, duration, etc.). Additionally, spatialization engine 317 may scale haptic data that is sent to other motors or actuators, causing other haptic effects that are experienced at those motors or actuators to be less pronounced (e.g., decreased magnitude, duration, etc.). In some embodiments, spatialization engine 317 may modify the haptic data in real-time or substantially in real time. Further, in some embodiments, spatialization engine 317 may have non-linear relationships between inputs and motor, or actuator, outputs in order to exaggerate an overall haptic effect.

Encoder 318 encodes haptic data received from direct playback/crossover 315, trigger engine 316, and/or spatialization engine 317 into a format. In one embodiment, the format may be an HES format. Encoder 318 may transmit the encoded haptic data to peripheral firmware 320.

Peripheral firmware 320 is firmware for one or more peripheral devices (e.g., controllers). Peripheral firmware 320 may include a variety of modules such as decoder and crossover 321, trigger control 322, trigger data 323, other functions 324, and rumble control 325.

Decoder and crossover 321 may receive the encoded haptic data from encoder 318 and decodes the encoded haptic data. In some embodiments, decoder and crossover 321 computes a programmable crossover in order to decode the encoded haptic data. Decoder and crossover 321 may compute the programmable crossover in real-time.

Trigger control 322 is a low-level control API for one or more targeted motors or targeted actuators of controller 330 (e.g., motors L and R of FIG. 3). Trigger control 322 may receive a trigger instruction and may convert the trigger instruction into a low-level trigger instruction for a specified targeted motor or targeted actuator of controller 330, and may transmit the low-level trigger instruction to the specified targeted motor or targeted actuator of controller 330. The low-level trigger instruction may cause the specified targeted motor or targeted actuator to produce a trigger haptic effect at a specified trigger of controller 330.

Trigger data 323, as previously described, is data that includes one or more parameters that indicate a position and/or range of one or more triggers of controller 330 (e.g., triggers L and R of FIG. 3). Trigger data 323 may be received from controller 330 by peripheral firmware 320. Peripheral firmware 320 may further store trigger data 323, and may further transmit trigger data 323 to device modules 310.

Other gamepad functions 324 may be functions of controller 330 managed by peripheral firmware 320. Such functions may include such functions as wired/wireless communications, input reporting, protocol implementation, power management, etc.

Rumble control 325 is a low-level control API for one or more rumble motors or rumble actuators of controller 330 (e.g., rumble motors L and R of FIG. 3). Rumble control 325 may receive a rumble instruction, may convert the rumble instruction into a low-level rumble instruction for a specified rumble motor or rumble actuator of controller 330, and may transmit the low-level trigger instruction to the specified rumble motor or rumble actuator of controller 330.

Trigger monitor 326 is a firmware module that is configured to monitor the positions of the user input elements and the status of their respective haptic output devices in controller 330. In addition, trigger monitor 326 is configured to monitor the user input elements and their respective haptic output devices to determine whether the user input and/or feedback signals are being received from controller 330. In some instances, feedback signals may be generated by the haptic output devices, and trigger monitor 326 may be configured to isolate the user input signals and to discard the feedback signals.

In the various embodiments, sections of firmware that are hardware independent may be separated from the sections that are hardware dependent. Here, hardware independent firmware may interact with the hardware dependent firmware by using functional pointers.

Controller 330 may include triggers L and R. Controller 330 may further include gear boxes L and R and motors L and R. Motor L and gearbox L are operably coupled to trigger L within controller 330. Likewise, motor R and gearbox R are operably coupled to trigger R within controller 330. When motor L receives a trigger instruction, motor L and gearbox L may collectively cause a trigger haptic effect to be experienced at trigger L. Likewise, when motor R receives a trigger instruction, motor R and gearbox R may collectively cause a trigger haptic effect to be experienced at trigger R. Peripheral firmware 320 may send trigger instructions to motors L and R of controller 330 using drive electronics 340.

Controller 330 may further include potentiometers L and R. Potentiometer L may detect a position and/or range of trigger L, and may further send the detected position and/or range of trigger L to peripheral firmware 320 as trigger data. Likewise, potentiometer R may detect a position and/or range of trigger R, and may further send the detected position and/or range of trigger R to peripheral firmware 320 as trigger data.

Controller 330 may further include rumble motors L and R. When rumble motor L receives a rumble instruction, rumble motor L causes a haptic effect to be experienced along a left component of controller 330. Likewise, when rumble motor R receives a rumble instruction, rumble motor R causes a haptic effect to be experienced along a right component of controller 330. Peripheral firmware 320 may send rumble instructions to rumble motors L and R using rumble drive electronics 350.

Figure 4:
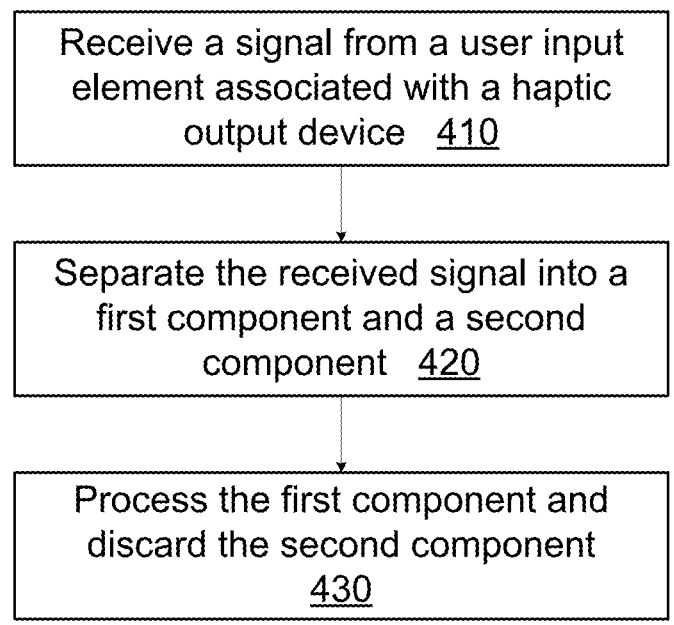
FIG. 4 illustrates a flow diagram of functionality for isolating a user input signal according to an example embodiment of the present invention.

FIG. 4 illustrates a flow diagram of functionality 400 for isolating a user input signal according to an example embodiment of the present invention. In some instances, the functionality of the flow diagram of FIG. 4 (and FIG. 5 below) may be implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 400 receives a signal from the user input element associated with the haptic output device, at 410. The received signal includes the user input signal, and may include an unintended feedback signal. Although the controller is configured to send the user input signal to the host device, the haptic output device may sometimes generate unintended feedback signals that interfere with the user input signals. For example, some haptic effects, such as high frequency haptic effects (e.g., machine gun effect), may produce feedback signals.

Next, functionality 400 separates the received signal into a first component and a second component. The first component includes the user input signal, and the second component includes the feedback signal, at 420.

In some embodiments, the user input signal and the feedback signal may be separated using one or more filters, such as a low pass, high pass, or band filter. The particular characteristics of the filters, such as frequency cutoff value (s) and filter order, may be determined according to the haptic output devices that are used and a power budged for its microcontroller unit ("MCU"). For example, the user input element may be configured to operate at a low frequency. In some instances, a low frequency user input signal may be used to distinguish the user input signal from higher frequency feedback signals. In this example, the filters may be configured to isolate the user input signal based on its low frequency value.

In an alternative configuration, the position and/or pressure applied to the user input element may be measured and compared to the received signal. In some instances, an expected received signal may be generated based on the measured position and/or pressure, and the expected signal may be compared to the received signal. Here, the user input signal may be isolated based on the result of the comparison. For example, if the haptic effect pulls the trigger in by 10%, and if the firmware reads the potentiometer at 30%, then the remaining 20% is the end user's contribution to the trigger's displacement. In other words, by comparing the expected movement based on the haptic effect with the actual movement, the user input component may be calculated.

Lastly, at 430, functionality 400 executes the user input signal of the first component and discards the feedback signal of the second component. By employing functionality 400, user input signals are more accurately executed as the interfering feedback signals are removed.

Figure 5:
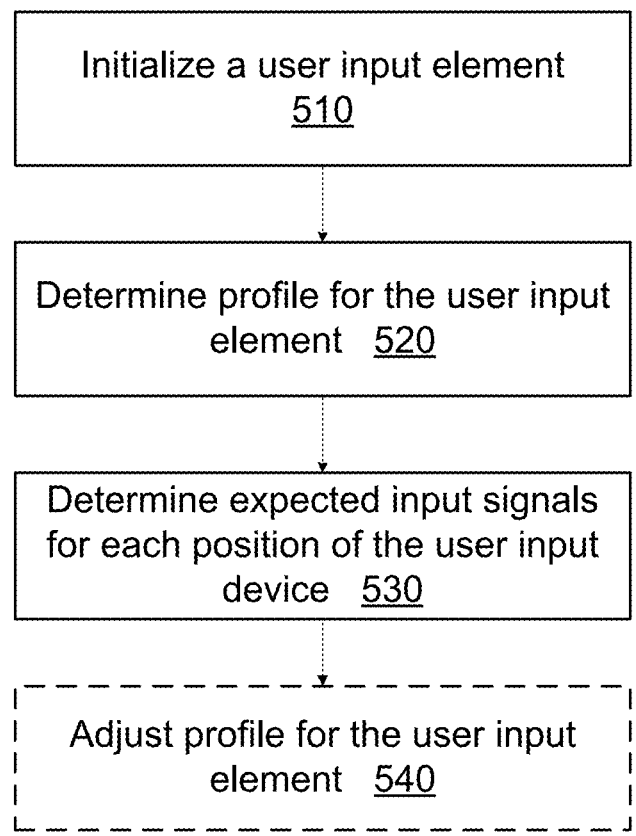
FIG. 5 illustrates a flow diagram of functionality for mapping positions of a user input element to expected input signals according to an example embodiment of the present invention.

FIG. 5 illustrates a flow diagram of functionality for mapping positions of a user input element with expected input signals according to an example embodiment of the present invention.

At the outset, the user input elements of the controller may be initialized, at 510. Here, functionality 500 may initially set position and range information for the user input elements. In some instances, these values may be calculated based on the movement of the user input device from the maximum out position to the grounding position.

Next, functionality 500 determines and stores profiles for the user input elements, at 520. The determined profiles may map each position of the user input device to an analog to digital conversion ("ADC") value. For example, the determined profiles of 520 may map each position of the user input device to an ADC value between 0 and 255.

The determined profiles may utilize either an increasing or a decreasing profile. For example, an increasing profile will produce a value [0.255] when the position of the user input value is read from an 8 bit ADC data. Similarly, a decreasing profile will produce a value [255.0] when read from the 8 bit ADC data.

Subsequently, at 530, functionality 500 determines and stores an expected input signal for each position of the user input device. In some instances, ranges of user input values may be associated with expected input signals.

In some instances, the resting position of the user input elements may vary at different times. For example, after use of the various user input devices, some of the user input devices may not return to the same resting position when the user interaction is removed. In such instances, functionality 500 may adjust the determined profile and expected user input values for such user input elements, at 540. Accordingly, the changed resting positions may be accounted for while monitoring the position of the user input elements.

Figure 6:
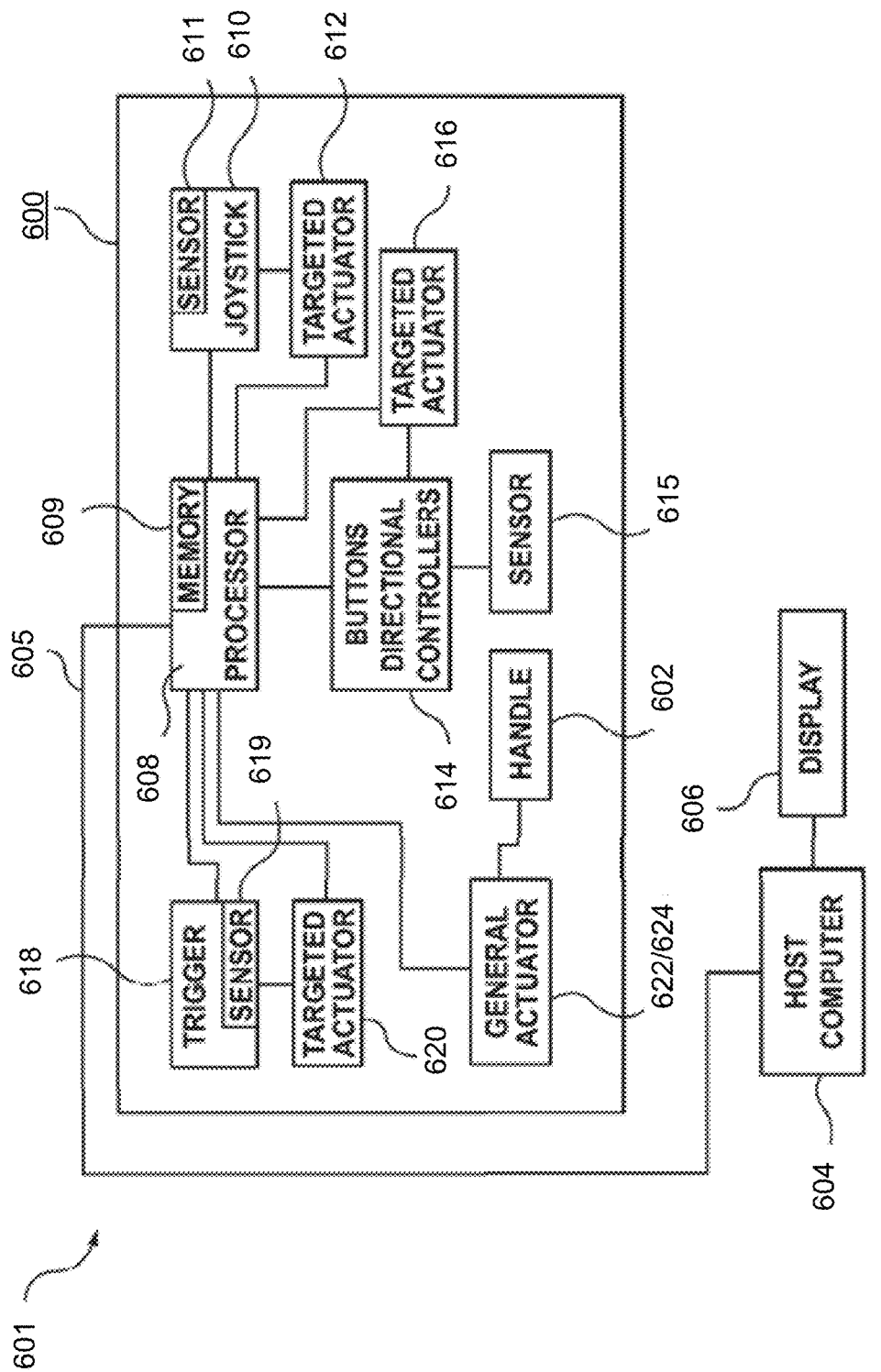
FIG. 6 illustrates a functional block diagram of a controller suitable for use with the embodiments of the present invention.

FIG. 6 illustrates a functional block diagram of a controller 600 suitable for use with the embodiments of the present invention.

As illustrated in FIG. 6, controller 600 may include one or more of a variety of user input elements. A user input element may refer to any interface device manipulated by the user to interact with host computer 604. Example user input elements include analog or digital joy stick 610, button 614, trigger 618, and the like. As understood by one of ordinary skill in the art, one or more of each user input element may be included on controller 600. For example, the present description of trigger 618 does not limit controller 600 to a single trigger. Similarly, those skilled in the art understand that multiple analog or digital sticks, buttons, and other user input elements may be used.

Controller 600 may include local processor 608. Local processor 608 may exchange commands and data with host computer 604 via connection 605. Connection 605 may be a wired or wireless connection using one or more communication protocols known to those skilled in the art. In some instances, controller 600 may be alternatively configured to not include local processor 608. Here, input/output signals from controller 600 may be handled and processed directly by host computer 604. Host computer 604 may be a gaming device console and display device 606 may be screen which is operably coupled to the gaming device console. In some instances, host computer 604 and display device 606 may be combined into a single device.

Controller 600 may include targeted actuators 612, 616, 620 (e.g., motors) to directly drive each of the user input elements thereof as well as one or more general or rumble actuators 622, 624 operably coupled to housing 602 in a location where a hand of the user is generally located. More particularly, analog or digital stick 610 includes a targeted actuator or motor 612 operably coupled thereto, button 614 includes a targeted actuator or motor 616 operably coupled thereto, and trigger 618 includes a targeted actuator or motor 620 operably coupled thereto. In addition to a plurality of targeted actuators, controller 600 includes a position sensor operably coupled to each of the user input elements thereof. More particularly, analog or digital stick 610 includes a position sensor 611 operably coupled thereto, button 614 includes a position sensor 615 operably coupled thereto, and trigger 618 includes a position sensor 619 operably coupled thereto. Local processor 608 is operably coupled to targeted actuators 612, 616, 620 as well as position sensors 611, 615, 619 of analog or digital stick 610, button 614, and trigger 618, respectively. In response to signals received from position sensors 611, 615, 619, local processor 608 instructs targeted actuators 612, 616, 620 to provide directed or targeted kinesthetic effects directly to analog or digital stick 610, button 614, and trigger 618, respectively. Such targeted kinesthetic effects are discernible or distinguishable from general or rumble haptic effects produced by general actuators 622, 624 along the entire body of the controller. The collective haptic effects provide the user with a greater sense of immersion to the game as multiple modalities are being simultaneously engaged (e.g., video, audio, and haptics).

Figure 7A:
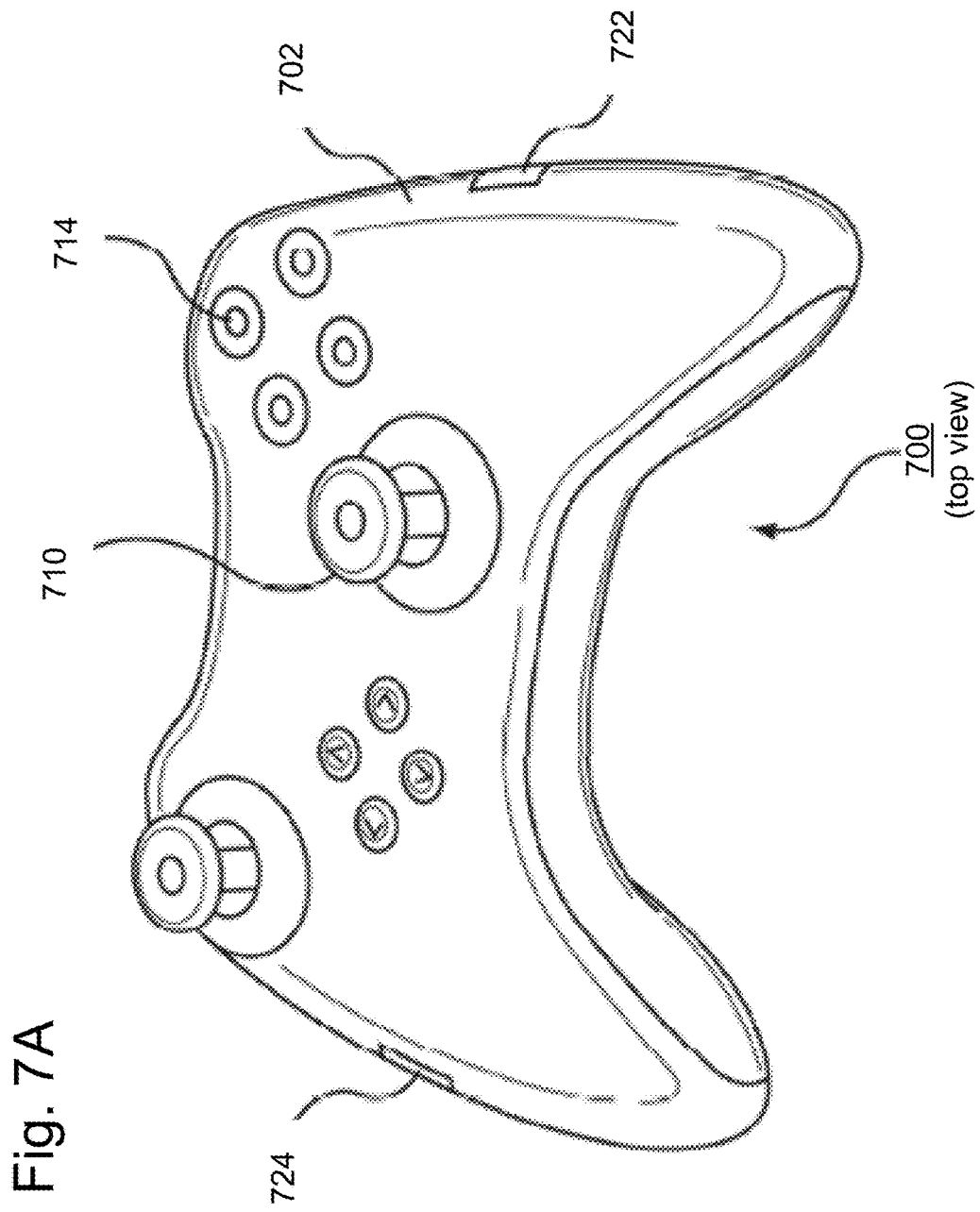
FIGS. 7A and 7B illustrate different views of a controller suitable for use with the embodiments of the present invention.
Figure 7B:
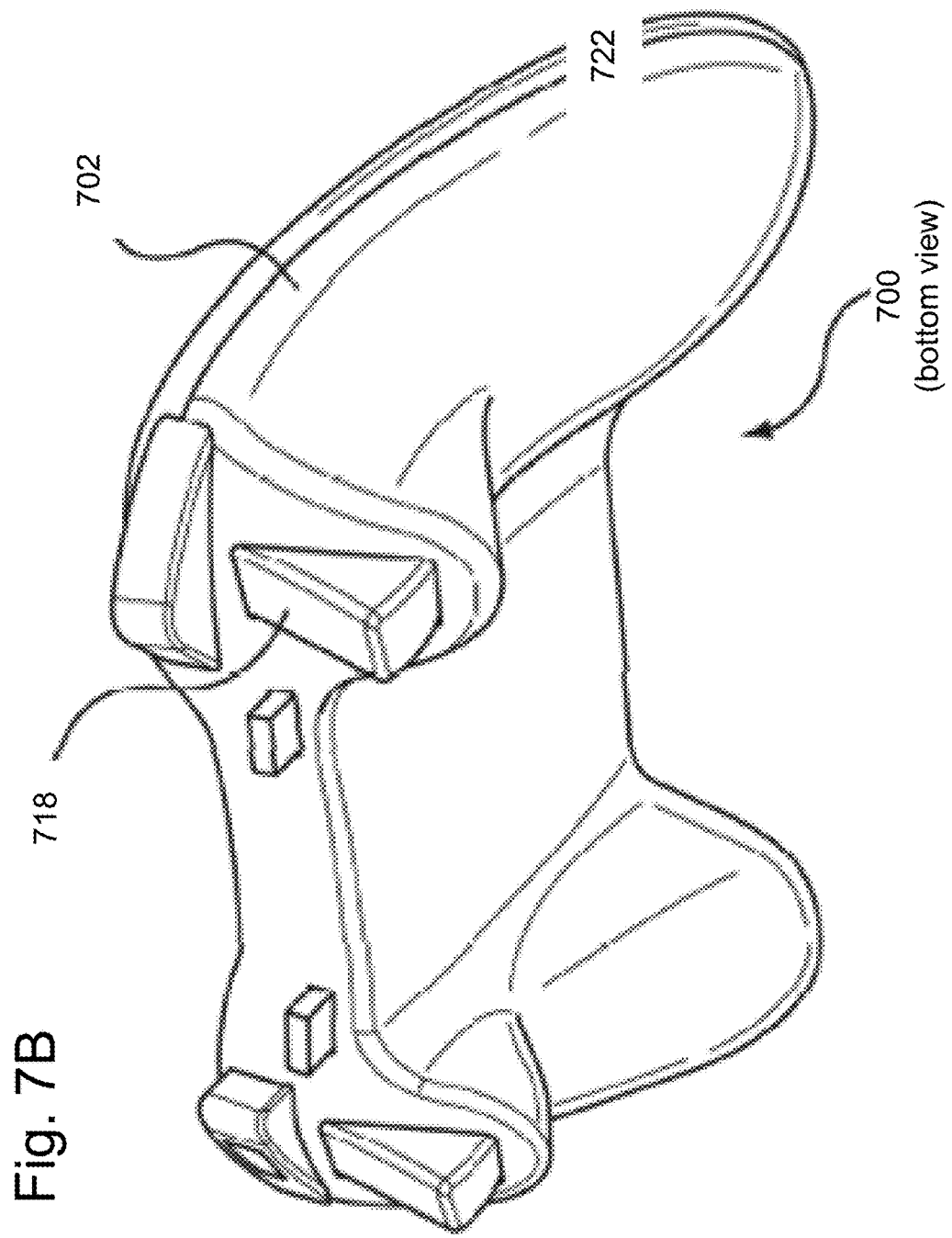

FIGS. 7A and 7B illustrate different views of a controller 700 suitable for use with the embodiments of the present invention. As shown in FIG. 7A and FIG. 7B, controller 700 may include a variety of components such as housing 702, analog or digital joy stick 710, button(s) 714, trigger 718, and rumble actuators 722 and 724.

Housing 702 is shaped to easily accommodate user gripping of controller 700. Controller 700 is an example embodiment of a controller, and the embodiments of the invention may be readily applied to other controller shapes.

Figure 8:
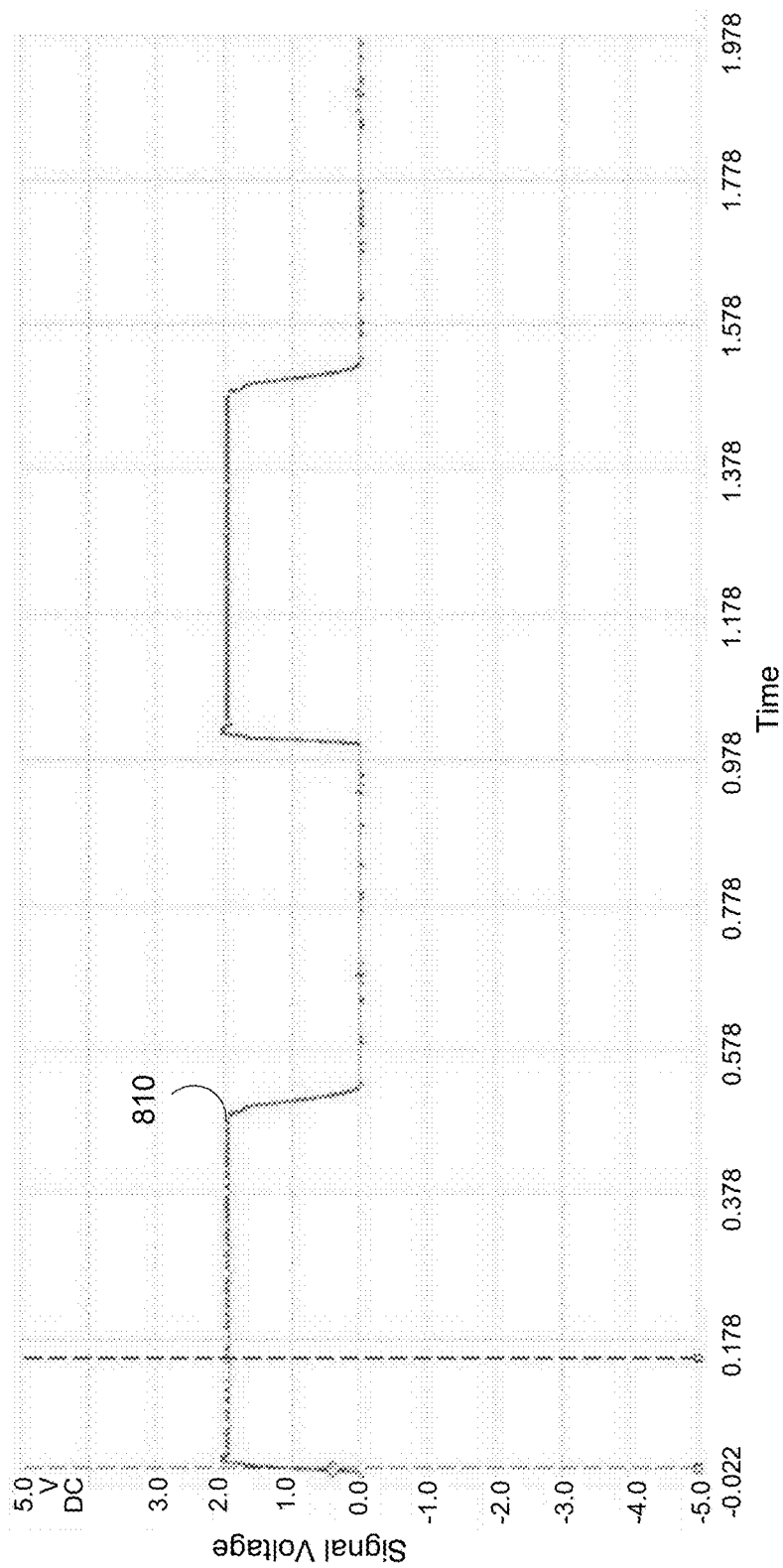
FIG. 8 illustrates an example feedback signal caused in a controller suitable for use with the embodiments of the present invention.

FIG. 8 illustrates an example feedback signal caused in a controller suitable for use with the embodiments of the present invention. As shown in FIG. 8, a 2V feedback signal 810 may be produced by the haptic output device in response to high frequency haptic effects (e.g., machine gun effect generated by a maximum push-pull effect). Although high frequency effects are used as an example, the embodiments of the invention may be applied to a variety of haptic effects and applications (e.g., racing games, sports games, etc.).

Accordingly, by implementing the various embodiments of the present invention, the effects of unintended feedback signals may be reduced. In addition, user input signals may be more accurately executed. These improvements are achieved by isolating user input signals. For example, a signal originating from a user input element associated with a haptic output device may include the feedback signal in addition to the user input signal. In order to avoid interference between the two signals, the received signal is separated into a first component including the user input signal, and a second component including the haptic feedback signal. While the first component having the user input signal may be executed by the host device, the second component can be discarded or otherwise ignored.

Although high frequency haptic effects are used as an example, the embodiments of the invention may be applied to a variety of haptic effects and applications. For example, the embodiments may be readily applied to car racing games by varying resistance applied to the haptic output devices to increase or decrease the difficulty of driving. In another example, the embodiments may be readily applied to combat games by varying resistance applied to the haptic output devices making the weapons easier or more difficult to fire.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for isolating a user input signal at a haptic output device, the method comprising:
   receiving a first signal from a user input element associated with the haptic output device;
   generating an expected signal based on a position of the user input element;
   comparing the expected signal to the first signal to isolate the user input signal;
   separating the first signal into a first component including the user input signal, and a second component associated with a haptic feedback signal; and
   processing the first component to execute an instruction according to the user input signal.

2. The method according to claim 1, wherein the haptic feedback signal is caused by generating a haptic effect at the user input element associated with the haptic output device.

3. The method according to claim 1, wherein the separating the first signal into the first component and the second component includes applying a frequency filter to the first signal.

4. The method according to claim 1, wherein the haptic feedback signal is a higher frequency signal compared to the user input signal.

5. The method according to claim 1, wherein the comparing the expected signal to the first signal includes comparing an expected movement and an actual movement of the user input element.

6. The method according to claim 1, wherein the haptic output device is located at a peripheral device comprising a controller or gamepad.

7. The method according to claim 1, wherein a haptic playback signal is produced at a trigger or a joy stick element of a peripheral device.

8. The method according to claim 1, wherein the first component is processed to cause a host device to execute an instruction based on the user input signal.

9. A device comprising:
   a processor; and
   a memory storing a program for execution by the processor, the program including instructions for:
   receiving a first signal from a user input element associated with a haptic output device;
   generating an expected signal based on a position of the user input element;

comparing the expected signal to the first signal to isolate a user input signal;

separating the first signal into a first component including the user input signal, and a second component associated with a haptic feedback signal; and processing the first component to execute an instruction according to the user input signal.

10. The device according to claim 9, wherein the haptic feedback signal is caused by generating a haptic effect at the user input element associated with the haptic output device.

11. The device according to claim 9, wherein the separating the first signal into the first component and the second component includes applying a frequency filter to the first signal.

12. The device according to claim 9, wherein the haptic feedback signal is a higher frequency signal compared to the user input signal.

13. The device according to claim 9, wherein the comparing the expected signal to the first signal includes comparing an expected movement and an actual movement of the user input element.

14. The device according to claim 9, wherein the haptic output device is located at a peripheral device comprising a controller or gamepad.

15. The device according to claim 9, wherein a haptic playback signal is produced at a trigger or a joy stick element of a peripheral device.

16. The device according to claim 9, wherein the first component is processed to cause a host device to execute an instruction based on the user input signal.

17. A non-transitory computer readable storage medium storing a program configured to be executed by a processor, the program comprising instructions for:

receiving a first signal from a user input element associated with a haptic output device;

generating an expected signal based on a position of the user input element;

comparing the expected signal to the first signal to isolate a user input signal;

separating the first signal into a first component including the user input signal, and a second component associated with a haptic feedback signal; and processing the first component to execute an instruction according to the user input signal.

18. The non-transitory computer readable storage medium of claim 17, wherein the haptic feedback signal is caused by generating a haptic effect at the user input element associated with the haptic output device.

19. The non-transitory computer readable storage medium of claim 17, wherein the separating the signal into the first component and the second component includes applying a frequency filter to the first signal.

20. The non-transitory computer readable storage medium of claim 17, wherein the haptic feedback signal is a higher frequency signal compared to the user input signal.

21. The non-transitory computer readable storage medium of claim 17, wherein the comparing the expected signal to the first signal includes comparing an expected movement and an actual movement of the user input element.

22. The non-transitory computer readable storage medium of claim 17, wherein the haptic output device is located at a peripheral device comprising a controller or gamepad.

23. The non-transitory computer readable storage medium of claim 17, wherein a haptic playback signal is produced at a trigger or a joy stick element of a peripheral device.

24. The non-transitory computer readable storage medium of claim 17, wherein the first component is processed to cause a host device to execute an instruction based on the user input signal.

* * * * *